United States Patent
Poole et al.

(10) Patent No.: US 11,036,837 B2
(45) Date of Patent: Jun. 15, 2021

(54) VERIFYING A USER OF A COMPUTER SYSTEM

(71) Applicant: International Business Machines Corporation, Armonk, NY (US)

(72) Inventors: Christopher J. Poole, Romsey (GB); Thomas J. Waterton, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 16/130,533

(22) Filed: Sep. 13, 2018

(65) Prior Publication Data
US 2020/0089847 A1 Mar. 19, 2020

(51) Int. Cl.
*G06F 21/00* (2013.01)
*G06F 21/31* (2013.01)
*G06F 11/34* (2006.01)
*G06F 9/54* (2006.01)

(52) U.S. Cl.
CPC .......... *G06F 21/316* (2013.01); *G06F 9/543* (2013.01); *G06F 11/3438* (2013.01)

(58) Field of Classification Search
None
See application file for complete search history.

(56) References Cited

U.S. PATENT DOCUMENTS

| | | | |
|---|---|---|---|
| 8,312,157 B2 | 11/2012 | Jakobsson et al. | |
| 9,185,095 B1 * | 11/2015 | Moritz | H04L 63/0861 |
| 9,870,455 B2 | 1/2018 | Song et al. | |
| 9,871,779 B2 | 1/2018 | Sheller et al. | |
| 10,509,907 B2 * | 12/2019 | Shear | G06F 21/64 |
| 2007/0006163 A1 * | 1/2007 | Aoki | G06F 21/31 717/127 |
| 2007/0239604 A1 * | 10/2007 | O'Connell | G06Q 20/4016 705/50 |
| 2010/0115610 A1 | 5/2010 | Tredoux et al. | |
| 2011/0016534 A1 | 1/2011 | Jakobsson et al. | |
| 2011/0019566 A1 | 1/2011 | Leemet et al. | |
| 2013/0042327 A1 | 2/2013 | Chow | |

(Continued)

OTHER PUBLICATIONS

Cao, Yongzhi et al. A Behavioral Distance for Fuzzy-Transition Systems. IEEE Transactions on Fuzzy Systems vol. 21, Issue: 4. https://ieeexplore.ieee.org/stamp/stamp.jsp?tp=&arnumber=6362199 (Year: 2013).*

(Continued)

*Primary Examiner* — Jeremiah L Avery
(74) *Attorney, Agent, or Firm* — Michael A. Petrocelli

(57) ABSTRACT

A method and system for verifying a user of a computer system are presented. One example comprises observing behavioral characteristics of the user's interactions with the computer system during a current session of computer system usage, the behavioral characteristics being based on command invocation behavioral characteristics. The example further comprises identifying variations between the observed behavioral characteristics and a behavioral profile developed based on prior command invocation behavioral characteristics of the user. A verification procedure for the user to complete to continue the current session is then implemented based on the identified variations between the observed behavioral characteristics and the behavioral profile.

17 Claims, 5 Drawing Sheets

(56) References Cited

U.S. PATENT DOCUMENTS

| | | | |
|---|---|---|---|
| 2015/0143494 A1* | 5/2015 | Lee | H04L 63/08 |
| | | | 726/7 |
| 2015/0205944 A1* | 7/2015 | Turgeman | G06F 21/554 |
| | | | 726/7 |
| 2015/0205958 A1* | 7/2015 | Turgeman | G06F 21/31 |
| | | | 726/23 |
| 2015/0373007 A1 | 12/2015 | Sheller et al. | |
| 2016/0099963 A1* | 4/2016 | Mahaffey | G06F 21/554 |
| | | | 726/25 |
| 2016/0171197 A1 | 6/2016 | Song et al. | |
| 2017/0243028 A1* | 8/2017 | LaFever | G06F 21/6263 |
| 2017/0364702 A1* | 12/2017 | Goldfarb | H04L 63/14 |

OTHER PUBLICATIONS

Wu, Hengyang; Deng, Yuxin. Distribution-Based Behavioral Distance for Nondeterministic Fuzzy Transition Systems. IEEE Transactions on Fuzzy Systems vol. 26, Issue: 2. https://ieeexplore.ieee.org/stamp/stamp.jsp?tp=&arnumber=7857763 (Year: 2018).*

Shi et al, "Implicit Authentication through Learning User Behavior", pp. 99-113, Springer-Verlag Berlin Heidelberg, 2011.

Masri et al, "Identifying Users With Application-Specific Command Streams", Jul. 23-24, 2014, pp. 232-238, 2014Twelfth Annual International Conference on Privacy, Security and Trust (ST), IEEE Xplore: Sep. 8, 2014.

Iinbarji, et al, "User Identification by Observing Interactions with GUIs", Multimedia Modeling, MMM2017, Lecture Notes in Computer Science, vol. 10132, Springer, Cham, 17 pages, Dec. 31, 2016.

* cited by examiner

VERIFYING A USER OF A COMPUTER SYSTEM

BACKGROUND

The present invention relates generally to verifying a user, and more particularly to verifying a user of a computer system based on behavioral characteristics of a user's interactions with the computer system.

The present invention also relates to a computer program product comprising computer-readable program code that enables a processor of a system to implement such a method.

The present invention yet further relates to a system for verifying a user of a computer system.

Currently, billions of people use networked computer systems to perform all sorts of tasks and business functions. Many computer system and online services employ a basic level of user verification/authentication wherein an individual is typically required to enter their username (e.g. an email address) and a password or pass code. Such verification/authentication information is then checked against stored records.

With the proliferation of identity theft and hacking, many types of conventional verification methods may be susceptible to circumvention. Attempts to make conventional verification methods more secure have typically relied upon additional verification checks or extra layers of security. However, such increased security measures typically reduce convenience or simplicity of use for an end user.

SUMMARY

The present invention seeks to provide a computer-implemented method for verifying a user of a computer system.

The present invention yet further seeks to provide a computer program product including computer program code for implementing a proposed method when executed by a processing unit.

The present invention yet further seeks to provide a processing system adapted to execute this computer program code.

The present invention also seeks to provide a system for verifying a user of a computer system.

According to an aspect of the present invention there is provided computer-implemented method for verifying a user of a computer system. The method comprises observing behavioral characteristics of the user's interactions with the computer system during a current session of computer system usage, the behavioral characteristics being based on command invocation behavioral characteristics. The method also comprises identifying variations between the observed behavioral characteristics and a behavioral profile developed based on prior command invocation behavioral characteristics of the user. The method further comprises implementing a verification procedure for the user to complete to continue the current session, the verification procedure being based on the identified variations between the observed behavioral characteristics and the behavioral profile.

According to another aspect of the invention, there is provided a computer program product for clustering geographic features for graphical representation of the geographic features on a geographical map. The computer program product comprises a computer readable storage medium having program instructions embodied therewith, the program instructions executable by a processing unit to cause the processing unit to perform a method according to a proposed embodiment of the present disclosure as described in the method above.

According to another aspect of the invention, there is provided a processing system comprising at least one processor and the computer program product according to an embodiment. The at least one processor is adapted to execute the computer program code of said computer program product to perform a method according to a proposed embodiment of the present disclosure as described in the method above.

According to yet another aspect of the invention, there is provided a system for verifying a user of a computer system. The system comprises a monitoring component configured to observe behavioral characteristics of the user's interactions with the computer system during a current session of computer system usage, the behavioral characteristics being based on command invocation behavioral characteristics. The system also comprises a comparison component configured to identify variations between the observed behavioral characteristics and a behavioral profile developed based on prior command invocation behavioral characteristics of the user. The system also comprises a verification component configured to implement a verification procedure for the user to complete to continue the current session, the verification procedure being based on the identified variations between the observed behavioral characteristics and the behavioral profile.

BRIEF DESCRIPTION OF THE DRAWINGS

Preferred embodiments of the present invention will now be described, by way of example only, with reference to the following drawings, in which.

DETAILED DESCRIPTION

Figure 1:
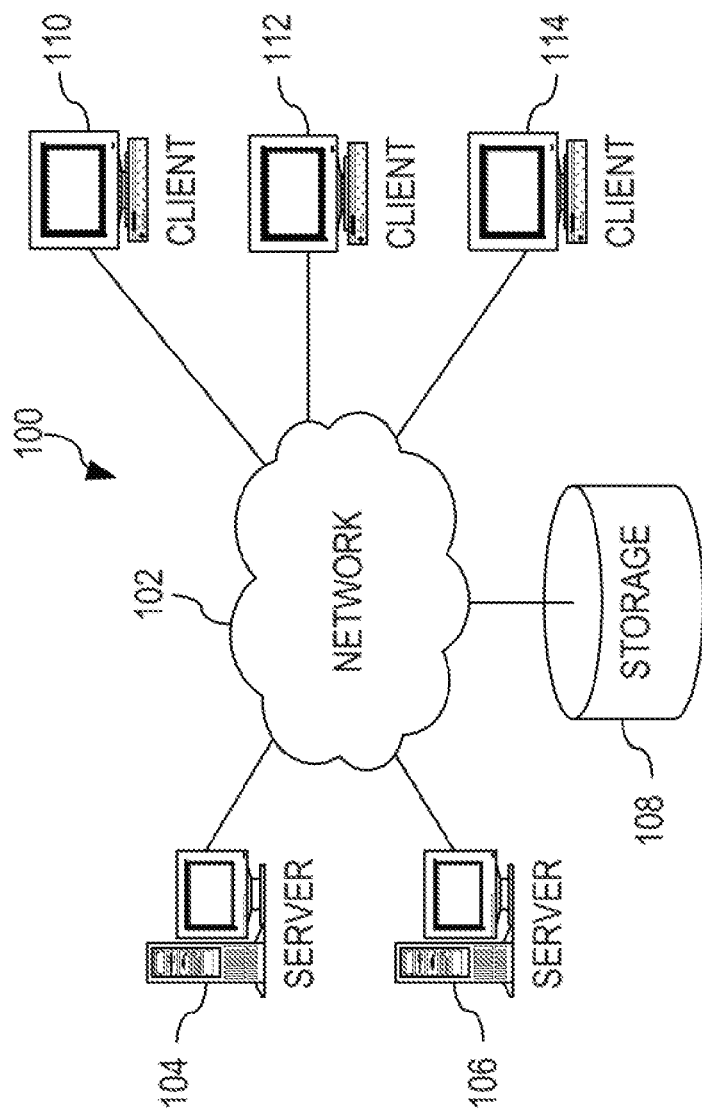
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept for verifying a user of a computer system. By identifying variations between: (i) the observed behavioral characteristics of the user's interactions with the computer system during a current session of computer system usage; and (ii) a behavioral profile developed based on prior command invocation behavioral characteristics, a verification procedure may be implemented. For example, if discrepancies between observed command invocation behavioral characteristics of a current session and historic command invocation behavioral characteristics are identified, it may be inferred that the user is not behaving as expected and thus may not, in fact, be the expected user. A verification procedure (e.g. in addition to that which the user passed in order to begin the current session) may therefore be implemented for the user to complete in order to be able to continue the current session for example.

By way of example, proposed embodiments may observe a user's behavioral pattern while they interact with a computer system by invoking commands, and may then store information about the user's typical computer system interaction behavior patterns as historical data. Then, when a new user session begins (e.g. after a user logs in), embodiments may compare the behavioral characteristics of the user's interactions during the new (i.e. current) with the historic data stored for that user. If discrepancies are identified between how the logged-in user interacted with the computer system and the expected behavior patterns indicated by the historic data, this may suggest fraudulent activity, and so the user may be required to enter further authentication data before they are able to proceed with the current session, or the current session may simply be terminated.

Thus, proposed embodiments may be configured to continuously track each user's computer usage habits over time, store this information, and use algorithms to determine a confidence factor for specific computer interaction events for that user account. Such information may then be used to further authenticate a user, and ultimately to grant or revoke access to accounts and/or services.

For clarification, reference to behavioral characteristics of a user's interactions with a computer system is to be taken to refer to behavioral characteristics that are based on command invocation behavioral characteristics. This is because it is proposed that a user will typically invoke commands on a computer system in particular way or manner, and thus a user will form a fixed habit of command invocation that can be uniquely attributed/associated to/with them. One or more characteristics of a user's behavior when invoking a command on a computer system may thus be used to define behavioral characteristics of that user. For example, individual users tend to form a habit of always listing/selecting a certain set of command options when invoking a command (such as a shell command for example). An exemplary command invocation behavioral characteristic may therefore comprise: a set of selected command options. By way of further example, individual users tend to form fixed habits of speech, which mean that they typically use the same sentence structure, word order, and/or word choice when invoking commands via speech (e.g. using a voice commands with a speech recognition input interface). Exemplary command invocation behavioral characteristics may therefore comprise: a grammatical structure of a command invocation; a set of words selected for a command invocation; and/or an order of words of a command invocation.

By way of example, command invocation behavioral characteristics may comprise at least one of: an order of command invocations; a set of selected command options; an order of entered command options; a grammatical structure of a command invocation; a set of words selected for a command invocation; an order of words of a command invocation; use of a shortcut for a command invocation; a chosen method for a command invocation; and a user input device used for command invocation. Behavioral characteristics employed by embodiments may therefore relate to one or more aspects of how a user provides, inputs or invokes commands Such aspects may relate to how a user launches applications or services, which applications or services are preferred or most frequently used, how a user closes applications or services, an order in which a user typical launches or uses applications or services, a preferred method for using applications, services or features, etc.

Accordingly, reference to a behavioral profile means a history of past or prior command invocation behavioral characteristics. Such a behavioral profile may represent a history of command invocation behavioral characteristics using derived metrics that are created by applying mathematical and statistical functions to the history of command invocation behavioral characteristics. Embodiments may therefore be adapted to develop a behavioral profile of a user by identifying typical command invocation behavioral characteristics of the user from historical computer system usage data.

Proposed embodiments may therefore provide methods and systems for verifying a user proactively based on normal or expected user patterns. As the user begins a new session interacting with a computer system, the interactions (or behaviors) when invoking commands (e.g. launching applications, closing applications, issuing voice commands) are observed and compared to normal or expected patterns of interaction identified by a behavioral profile for the user. It is proposed that a fraudsters behavior will deviate enough from a user's normal pattern that the presence of fraud can be detected.

Detecting these deviations, or anomalies, relies on a behavioral profile developed for the user by looking at the previous/prior behavior of the user when interacting with a computer system. The behavioral characteristics may be based on previous/prior command invocation behavioral characteristics that are observed for the user, such as: an order of words used for a command invocation; use of a shortcut for a command invocation; a chosen method for a command invocation; a user input device used for command invocation, etc. By comparing characteristics of command invocation in a current session to characteristics of command invocation in previous sessions, the previous behavioral characteristics embodied in a behavioral profile may reveal deviations.

Depending upon the importance or significance of the detected variations between the current behavioral characteristics and the previous behavioral characteristics, a verification procedure may be implemented to proceed in the session. The verification procedure may require the user to provide additional verification information, allow the user to proceed with the session, or reject the user from continuing with the session. In some embodiments, the verification procedure may provide a verification challenge to the user, which may ask the user additional information for example. However, in some embodiments, the user may be verified without the user responding to a request (e.g., information may be collected from another device or verification source). In some cases, the verification challenge may be different based on the detected variation and the sensitivity of the information and/or activity being requested by the user.

Proposed concepts may therefore provide an efficient and secure user verification system and method for verifying a user of a computer system. The system and method may be capable of confirming the identity of a user without the user needing to knowingly complete supplementary or additional security checks that may be time-consuming, inconvenient and/or complex. Further, proposed embodiments may be capable of tracking changes in behavioral characteristics of a user over time, thus enabling a behavioral profile to be responsive and/or dynamic.

Embodiments may provide concepts that facilitate the efficient and effective verification of a user of a computer system. Such verification concepts may be based on the behavioral characteristics of how a user invokes commands when using a computer system. It is proposed that command invocation behavioral characteristics may indicative of users and thus used to reliably verify a user's identity.

By way of further example, embodiments may propose extensions to existing computer systems and/or verification systems. Such extensions may enable a computer system to provide additional security by leveraging proposed concepts. In this way, a conventional computer system may be upgraded by implementing or 'retro-fitting' a proposed embodiment.

Illustrative embodiments may provide concepts for analyzing command invocation behavioral characteristics during a current session of computer system usage and then verifying a user of the current system based on variations between the observed command invocation behavioral characteristics and a behavioral profile (developed based on prior command invocation behavioral characteristics of the user). Dynamic user verification concepts may therefore be provided by proposed embodiments.

Modifications and additional steps to a traditional user verification system or method may also be proposed which may enhance the value and utility of the proposed concepts.

In some embodiments, the process of identifying variations between the observed behavioral characteristics and the behavioral profile may comprise calculating a measure of distance between the observed behavioral characteristics and the behavioral profile. The measure of distance may, for example, be a Damerau-Levenshtein distance. Embodiments may therefore employ conventional techniques for assessing variations or difference that may exist between observed behavioral characteristics of a user in a current session and the behavioral profile of the user. This may facilitate simple and/or cheap implementation of embodiments, because existing algorithms or components may be employed (rather than needing to develop unique or proprietary algorithms/components).

Further, the process of implementing a verification procedure for the user to complete to continue the current session may comprise defining a verification procedure based on the calculated measure. In this way, an amount of additional or supplementary verification requirements may depend on how different the observed behavioral characteristics are from the expected behavioral characteristics represented by the behavioral profile. For example, if the observed behavioral characteristics match those indicated to be expected by the behavioral profile, the verification procedure may not require further action or details from the user but may instead simply allow the user to current user to continue the current session.

In some embodiments, in implementing a verification procedure for the user to complete to continue the current session, the challenge verification procedure may be further based on a risk level of the current session. Additional verification required of the user may therefore depend on an importance, value or sensitivity of the user's activity. For example, a request to access confidential information may require multiple verification steps/actions be to successfully completed by the user, whereas a request to view a publically available website may require fewer verification steps/actions be to successfully completed by the user.

Embodiments may be configured to determine a risk level of the current session based on one or more requested activities of the current session. Such embodiments may therefore be self-sufficient and adaptive to various usage circumstances.

Some embodiments may be configured to modify the behavioral profile based on the observed behavioral characteristics of the user's interactions with the computer system during the current session of computer system usage. In this way, the behavioral profile may be updated or maintained to reflect slight variations in a user behavior which, although different from what may have been expected, are not significant enough to be indicative of a fraudulent use. Such dynamic and continuous modification may provide for improved accuracy.

By way of example, an embodiment may comprise determining if the user is verified based on completion of the verification procedure by the user, and then, if it is determined the user is verified, the behavioral profile may be modified based on the identified variations between the observed behavioral characteristics and the behavioral profile. In this way, a variation in behavior that resulted in additional verification being wrongly required may be accounted for, thereby improving the accuracy of the behavioral profile for example.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
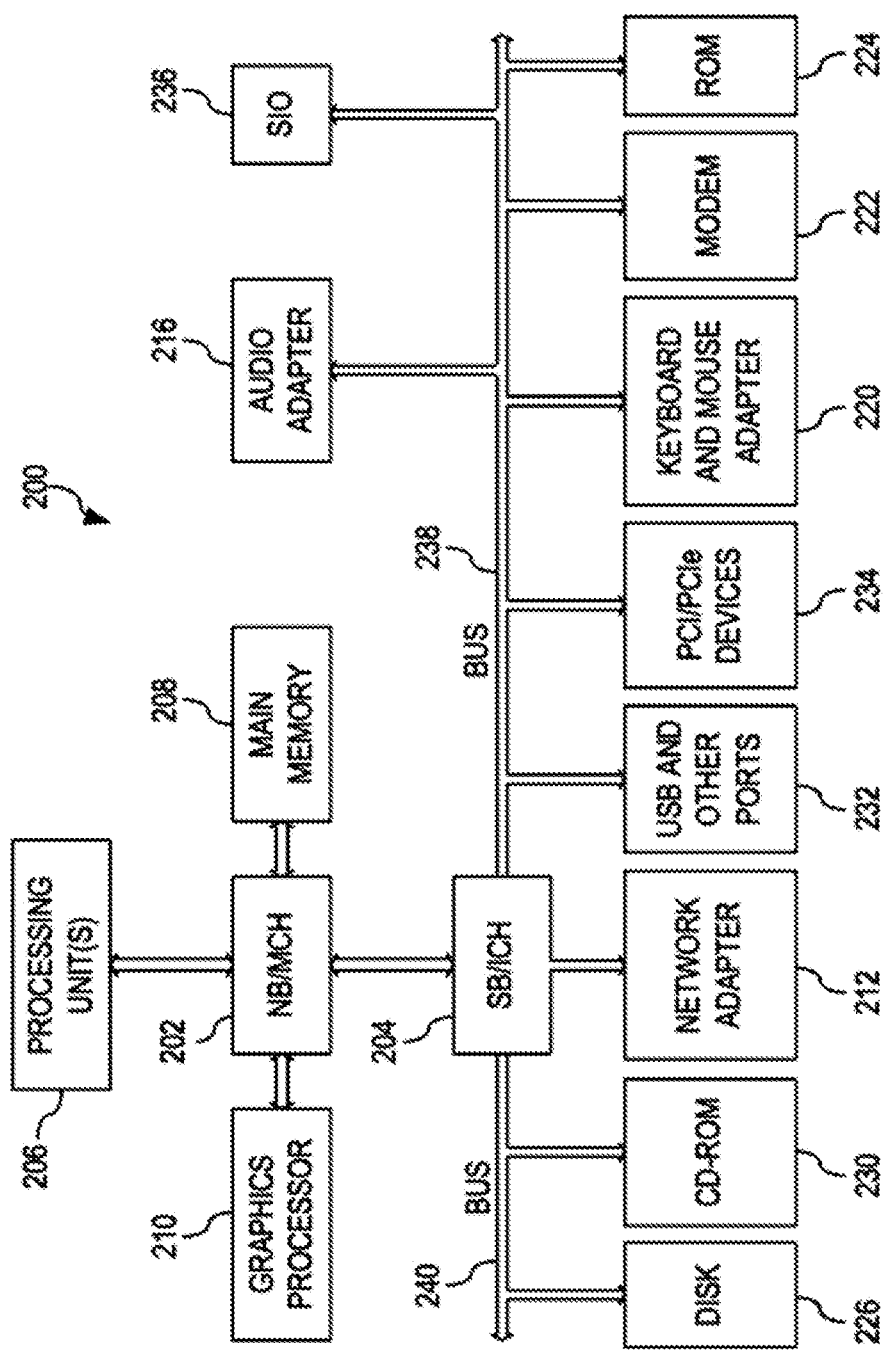
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, chosen from existing computer systems and use existing operating systems. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a computer system by facilitating a supplementary user verification process that is based on observed behavioral characteristics of a user during a current session of computer system usage. Embodiments may compare observed command invocation behavioral characteristics of the user during the current session with a behavioral profile developed based on prior command invocation behavioral characteristics of the user. Differences between the observed command invocation behavioral characteristics and the behavioral profile for the user may be used to determine if a fraudulent or different user is in fact using the computer system. Based on the identified variations between the observed behavioral characteristics and the behavioral profile, a verification procedure may then be implemented for the user to complete to continue the current session. In this way, a fraudulent user may be prevented from continuing a current session whereas the correct/authentic user may avoid being burdened with having to complete such an additional verification process.

Figure 3:
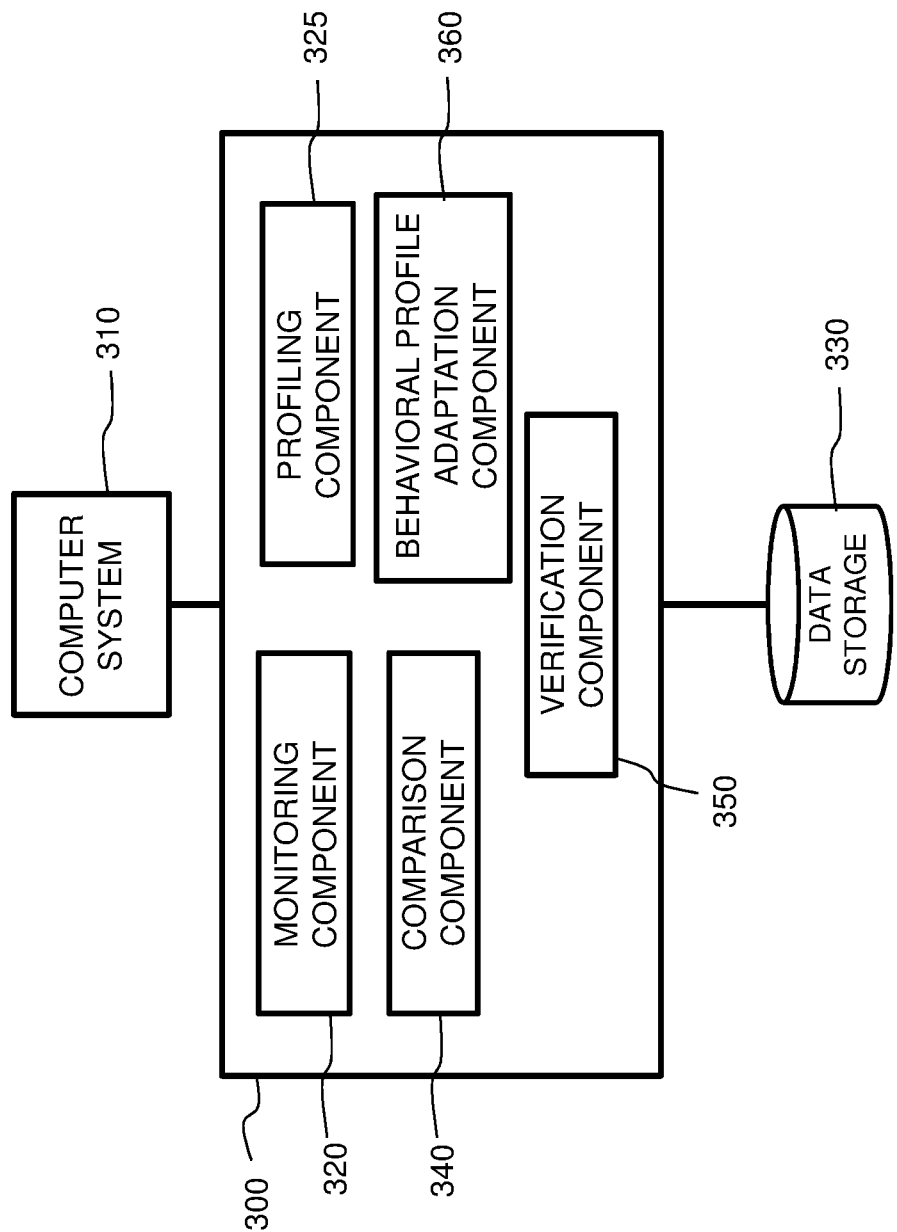
FIG. 3 is a simplified block diagram of a system for verifying a user of a computer system according to an embodiment.

FIG. 3 is a simplified block diagram of a system 300 for verifying a user of a computer system 310 according to an embodiment.

Here, the system 300 comprises a monitoring component 320 configured to observe behavioral characteristics of the user's interactions with the computer system during a current session of computer system usage. The behavioral characteristics are based on command invocation behavioral characteristics. By way of example, the command invocation behavioral characteristics comprise at least one of: an order of command invocations; a set of selected command options; an order of entered command options; a grammatical structure of a command invocation; a set of words selected for a command invocation; an order of words of a command invocation; use of a shortcut for a command invocation; a chosen method for a command invocation; and a user input device used for command invocation.

The system 300 also comprises a profiling component 325 that is configured to develop a behavioral profile based on prior command invocation behavioral characteristics of the (expected) user. In particular, the profiling component 325 is configured to identify typical command invocation behavioral characteristics of the (expected) user from historical computer system usage data. In this example, such historical computer system usage data is stored in a data storage unit 330. The profiling component 325 is therefore configured to retrieve historical computer system from the data storage unit 330 for the purpose of generating a behavioral profile.

The system 300 further comprises a comparison component 340 configured to identify variations between the observed behavioral characteristics and a behavioral profile (as developed by the profiling component 325) for the (expected) user. More specifically, the comparison component 340 is configured to calculate a measure of distance between the observed behavioral characteristics and the behavioral profile for the user. For example, a measure of distance between the observed behavioral characteristics and the behavioral profile may comprise a Damerau-Levenshtein distance between the observed behavioral characteristics and the behavioral profile. The Damerau-Levenshtein distance provides an algorithm that could be used to establish a numeric value representing the variance (or "distance") between the observed behavioral characteristics and the behavioral profile. Of course, it will be appreciated that over techniques, algorithms or approaches for a measure of distance between the observed behavioral characteristics and the behavioral profile for the user may be readily-known and employed by the comparison component 340.

A verification component 350 of the system 300 is configured to implement a verification procedure for the user to complete in order to continue the current session. The verification procedure is based on the identified variations between the observed behavioral characteristics and the behavioral profile. For instance, in this embodiment, the verification component 350 is configured to define a verification procedure based on the calculated measure of distance between the observed behavioral characteristics and the behavioral profile. Such a verification procedure provides a verification challenge to the user, wherein the verification challenge is based on the identified variations between the observed behavioral characteristics and the behavioral profile. Based on the user's response to the verification challenge, the verification procedure will either permit the user to continue the current session, request further verification information, or end the session (thus preventing the user from continue the session).

The verification component 350 of this example is configured to implement the verification procedure further based on a risk level of the current session. For example, if a measure of distance calculated by the comparison component 340 is lower than a predetermined risk threshold value, the user is deemed to be behaving in a manner consistent with what the system knows about them, and so is allowed to continue the current session. Here it is noted that the user will therefore remain unaware that such checks are happening. However, if the measure of distance calculated by the comparison component 340 exceeds the risk threshold value, the user is deemed as needing to be verified and so a verification challenge is then provided the user (or the user could simply be prevented from further use of the account).

In the embodiment of FIG. 3, the system 300 also comprises a behavioral profile adaptation component 360 configured to modify the behavioral profile based on the identified variations between the observed behavioral characteristics and the behavioral profile, if it is determined the user is verified. In this way, a variation in behavior that resulted in additional verification being wrongly required may be accounted for by modifying (e.g. updating, refining or correcting) the behavioral profile for the user.

The embodiment presented in FIG. 3 may continuously track each user's computer usage habits over time, store this information (in behavior profiles), and use algorithms to determine a confidence factor for specific computer interaction events for that user account. This information may then be used to further authenticate a user, and ultimately to grant or revoke access to accounts and services.

By of further example, exemplary implementations of proposed concepts will now be detailed as follows:

FIRST EXAMPLE IMPLEMENTATION

There is a well-used shell command "$ ls", which lists directory contents. This command can take various options, such as "-a" (to list all files, including hidden files), -l (to list files in long format, including information such as file permissions, file size, last modified timestamp), and -r (to list the files in reverse order), etc.

Such options can be entered by a user in any order (so running $ ls -arl is the same as running $ ls -lar), but individual users tend to form a habit of always listing the options in the same order.

Furthermore, the exact command entered by a given user is typically recorded in a log file.

Example: A first user ("Bob") often uses the shell command "$ ls" to list directory contents. Bob always enters the command as: $ ls -lar (and this information is stored in a log file).

One day, someone logs into a server with Bob's user credentials (e.g. with the username and password associated with Bob's account). The logged-in user then opens a command terminal and enters the command: $ ls -arl.

At this point, the system compares this user interaction (entering $ ls -arl) with the historic user pattern for this user account (where >99% of the time, the user had entered this command as $ ls -lar) and identifies that there is an apparent discrepancy in user behavior.

Based on the level of risk and level of discrepancy of particular user behavior, the system could be set to either require the logged-in user to provide additional verification details (e.g. provide a further answer to a previously set security question), or the system may be configured to terminate the user session.

SECOND EXAMPLE IMPLEMENTATION

More and more applications are being developed or adapted to enable people to use voice commands to operate them. Such technologies are sophisticated enough to be able to process natural human language, which means that the people using them do not need to "learn" specific command prompts, but can use normal vernacular language to issue commands Thus, saying "Siri, message Joe Bloggs" is interpreted the same as the saying: "Hey, Siri. Please send a text message to Joe Bloggs."

In fact, the grammatical structure of a sentence can vary, but still be understood as being the same essential command:

"Remind me to buy some milk" (verb/pronoun/preposition/verb/noun) is understood to mean the same as "Add a reminder to my calendar to buy some milk" (verb/noun/preposition/noun/verb/noun).

Similarly, the order of words and the specific choice of words/phrases can all vary to some degree yet still be understood by the voice-activated technologies as related to the same essential request.

However, individual users tend to form fixed habits of speech, which means that they typically use the same command invocation behavioral characteristics, such as sentence structure, word order, and word choice, when issuing common commands. Accordingly, a behavioral profile can be developed based on command invocation behavioral characteristics of an individual's prior spoken commands. Thus, when he/she issues new voice commands, the command invocation behavioral characteristics (such a grammatical structure, word order, and word choice, etc.) of the new command may be compared against the behavioral profile to identify any potential discrepancies in spoken behavior.

It is to be understood that the two exemplary implementations provided above are just two of many possible aspects of a computer user's typical behavioral characteristics which may be employed to implement a verification procedure according to proposed concepts.

There are many other potential implementations that could also be used to build up a picture of an individual's regular computer behavioral characteristics when interacting with a computer system. Some other examples include the following:

(i) Whether a user typically uses keyboard shortcuts and the tab key to navigate between software programs, as opposed to using a mouse to control the GUI. For example, if a user typically uses Cmd+Tab to switch between running applications, or uses Cmd+T to open a new browser tab, then using the mouse to switch between running applications or to open a new browser tab could be recorded as potentially suspect. Similarly, if a user typically uses Cmd+C/Cmd+V to copy and paste data, using the mouse to perform such actions might also be recorded as potentially suspect. Accordingly, a command invocation behavioral characteristic employed by an embodiment may comprise: use of a shortcut for a command invocation; a chosen method for a command invocation; or a user input device used for command invocation.

(ii) The mechanism of launching apps. Whether the user typically uses the cursor to click on an application icon, or uses a command terminal, or uses Spotlight search on a Mac, etc. Accordingly, a command invocation behavioral characteristic employed by an embodiment may comprise: a chosen method for a command invocation; or a user input device used for command invocation.

(iii) The order of starting apps upon a restart of the machine. Upon restarting their laptops or tablets, many computer users will initially launch the same few apps, often in the same order. Accordingly, a command invocation behavioral characteristic employed by an embodiment may comprise: an order of command invocations.

(iv) How applications are typically closed. Whether an individual user tends to close applications by pressing Cmd+Q or by using their cursor to interact with the GUI, etc. Accordingly, a command invocation behavioral characteristic employed by an embodiment may comprise: use of a shortcut for a command invocation; a chosen method for a command invocation; or a user input device used for command invocation.

Accordingly, the above exemplary command invocation behavioral characteristic, plus many more, may be used to build up a behavioral profile that is representative an individual's typical computer usage behavior.

For any given user, a degree of "typical behavior" may then be established. For example, it may be identified that a user "Bob" uses Cmd+Q as a method of closing applications >95% of the time, whereas another user "Sarah" uses the cursor and the GUI to close applications >99% of the time. Future observed behavioral characteristics for these user accounts can then be compared to these establish patterns to determine if a different user is using their account.

Figure 4:
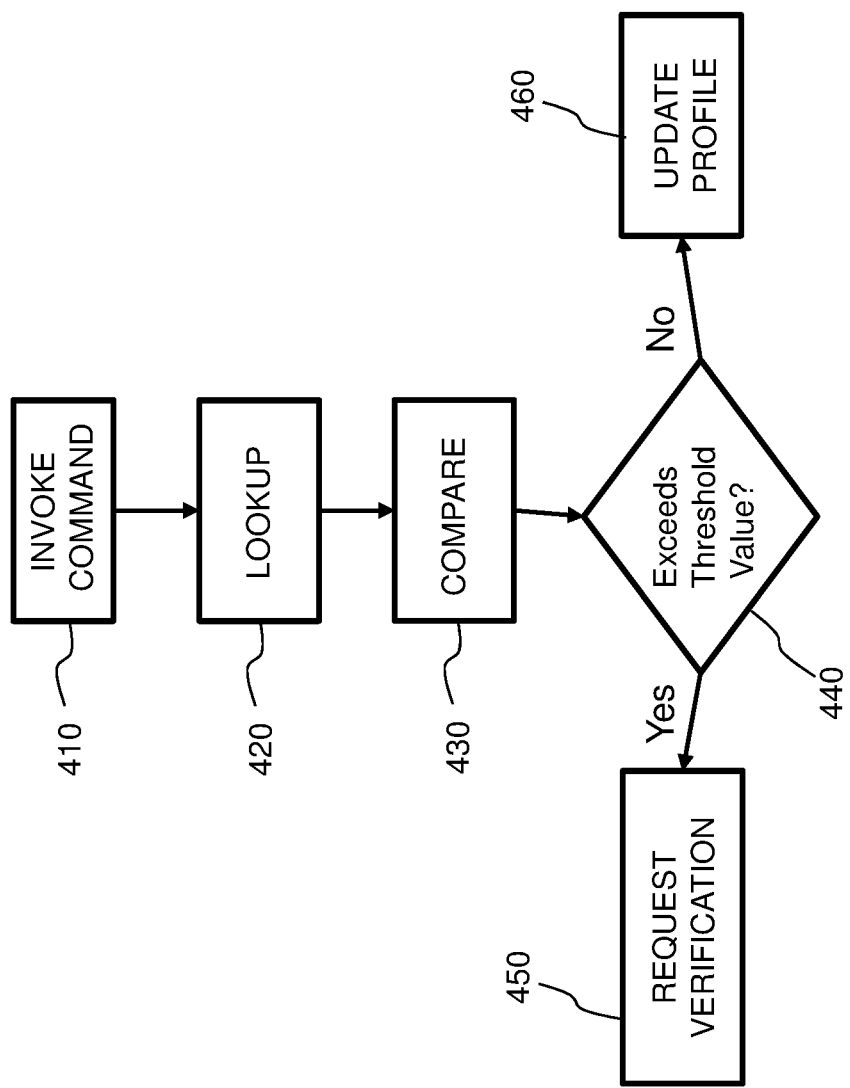
FIG. 4 is a flow diagram of a method for verifying a user of a computer system according to another embodiment.

Referring now to FIG. 4, there is depicted a flow diagram of a method for verifying a user of a computer system according to an exemplary embodiment.

The method begins with step 410 of observing behavioral characteristics of the user's interactions with the computer system during a current session of computer system usage. Here, it is observed that the user invoked a 'copy clipboard content' command and a behavioral characteristic of the command invocation is recorded. More specifically, the behavioral characteristic noted is 'chosen method for the command invocation'.

Next, in step 420, a behavioral profile for the user is looked-up (e.g. retrieved from a database). The behavioral profile is based on previous command invocation behavioral characteristics of the user. More specifically, in this example, the behavioral profile comprises information representative of the user's behavioral characteristics for invoking a 'copy clipboard content' command Such information may, for example, comprise one or more numerical values indicating how much use the user has previously made of each available method for invoking a 'copy clipboard content' command (e.g. a count value for each of 'Keyboard Shortcut', 'Touchbar' and 'Menu' options).

In step 430, the observed behavioral characteristic of the command invocation and the behavioral profile are compared so as to identify variations between the observed behavioral characteristic and the behavioral profile. The identified variations are quantified, for example using a numerical value or distance measure value, and then assessed against a predetermined threshold value in step 440.

If, in step 440, it is determined that the quantified variation exceeds the threshold value, the method proceeds to step 450 wherein a request for verification information is provided to the user. This request for verification acts as an additional or supplementary level of security to determine if the identified variation(s) between the observed and expected behavioral characteristic are attributed to a unexpected (e.g. fraudulent) user.

If, in step 440, it is determined that the quantified variation does not exceed the threshold value, the method proceeds to step 460 wherein the behavioral profile is updated or modified based on the observed behavioral characteristic. This helps to maintain up-to-date comprises information representative of the user's behavioral characteristics for invoking a command (e.g. the 'copy clipboard content' command).

Figure 5:
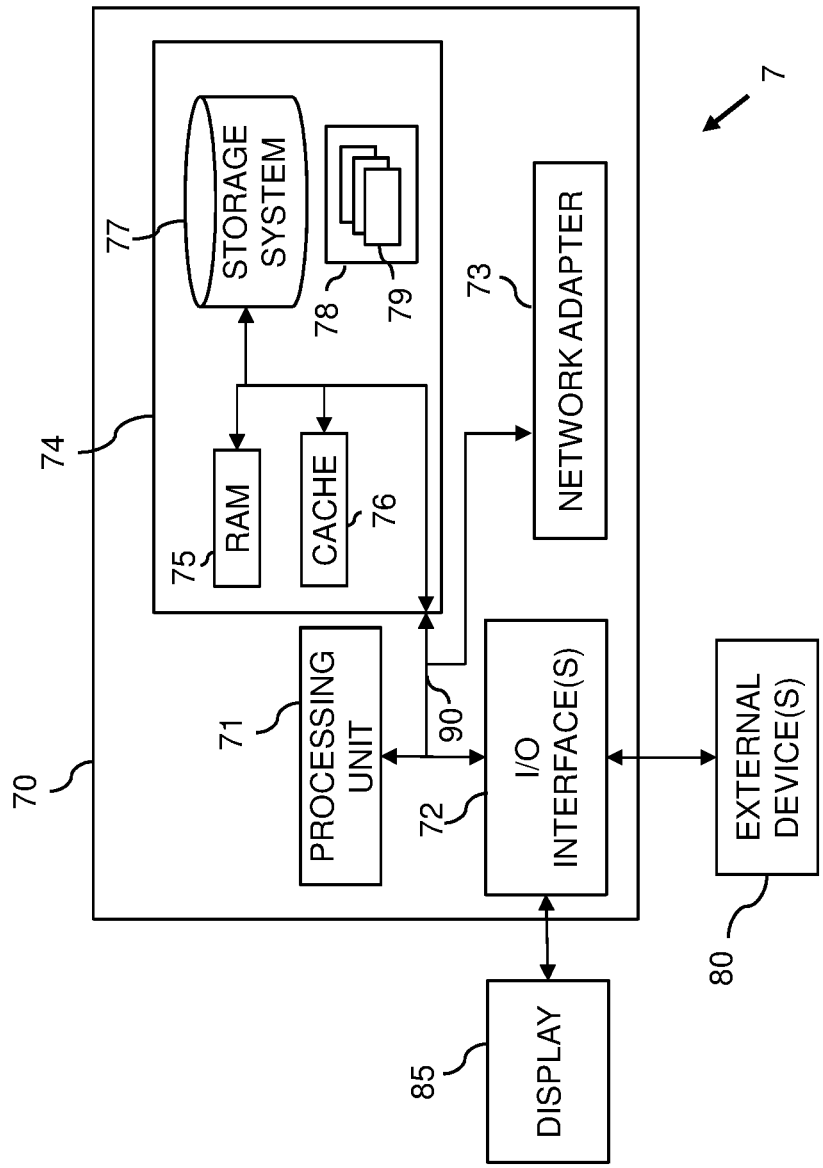
FIG. 5 illustrates a system for verifying a user of a computer system according to an embodiment.

By way of further example, as illustrated in FIG. 5, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for verifying a user of a computer system, comprising:
    observing behavioral characteristics of the user's interactions with the computer system during a current session of computer system usage, the behavioral characteristics being based on command invocation behavioral characteristics;
    identifying variations between the observed behavioral characteristics and a behavioral profile developed based on prior command invocation behavioral characteristics of the user; and
    implementing a verification procedure for the user to complete to continue the current session, the verification procedure being based on the identified variations between the observed behavioral characteristics and the behavioral profile;
    wherein identifying variations between the observed behavioral characteristics and the behavioral profile includes, calculating a measure of distance between the observed behavioral characteristics and the behavioral profile, and wherein implementing a verification procedure for the user to continue the current session includes, defining a verification procedure based on the calculated measure of distance which includes a verification challenge to the user, the verification challenge being based on the identified variations between the observed behavioral characteristics and the behavior profile.

2. The method of claim 1, further comprising:
    developing the behavioral profile by identifying typical command invocation behavioral characteristics of the user from historical computer system usage data.

3. The method of claim 1, wherein calculating a measure of distance between the observed behavioral characteristics and the behavioral profile comprises:
    Calculating a Damerau-Levenshtein distance between the observed behavioral characteristics and the behavioral profile.

4. The method of claim 1, wherein in the step of implementing a verification procedure for the user to complete to continue the current session, the challenge verification procedure is further based on a risk level of the current session.

5. The method of claim 4, further comprising:
    determining a risk level of the current session based on one or more requested activities of the current session.

6. The method of claim 1, wherein the command invocation behavioral characteristics are selected from a group consisting of:
    an order of command invocations;
    a set of selected command options;
    an order of entered command options;
    a grammatical structure of a command invocation;

a set of words selected for a command invocation;
an order of words of a command invocation;
use of a shortcut for a command invocation;
a speed of command invocation;
a chosen method for a command invocation; and
a user input device used for command invocation.

7. The method of claim 1, further comprising:
modifying the behavioral profile based on the observed behavioral characteristics of the user's interactions with the computer system during the current session of computer system usage.

8. The method of claim 1, further comprising:
determining if the user is verified based on completion of the verification procedure by the user; and
if it is determined the user is verified, modifying the behavioral profile based on the identified variations between the observed behavioral characteristics and the behavioral profile.

9. The method of claim 1, wherein the verification procedure comprises:
providing the verification challenge to the user, the verification challenge being based on the identified variations between the observed behavioral characteristics and the behavioral profile; and
permitting the user to continue the current session based on the user's response to the verification challenge.

10. A computer program product for verifying a user of a computer system, the computer program product comprising a computer readable storage medium having program instructions embodied therewith, the program instructions executable by a processing unit to cause the processing unit to perform a method comprising:
observing behavioral characteristics of the user's interactions with the computer system during a current session of computer system usage, the behavioral characteristics being based on command invocation behavioral characteristics;
identifying variations between the observed behavioral characteristics and a behavioral profile developed based on prior command invocation behavioral characteristics of the user; and
implementing a verification procedure for the user to complete to continue the current session, the verification procedure being based on the identified variations between the observed behavioral characteristics and the behavioral profile;
wherein identifying variations between the observed behavioral characteristics and the behavioral profile includes, calculating a measure of distance between the observed behavioral characteristics and the behavioral profile, and wherein implementing a verification procedure for the user to continue the current session includes, defining a verification procedure based on the calculated measure of distance which includes a verification challenge to the user, the verification challenge being based on the identified variations between the observed behavioral characteristics and the behavior profile.

11. A system for verifying a user of a computer system, comprising:
a monitoring component configured to observe behavioral characteristics of the user's interactions with the computer system during a current session of computer system usage, the behavioral characteristics being based on command invocation behavioral characteristics;
a comparison component configured to identify variations between the observed behavioral characteristics and a behavioral profile developed based on prior command invocation behavioral characteristics of the user; and
a verification component configured to implement a verification procedure for the user to complete to continue the current session, the verification procedure being based on the identified variations between the observed behavioral characteristics and the behavioral profile;
wherein identifying variations between the observed behavioral characteristics and the behavioral profile includes, calculating a measure of distance between the observed behavioral characteristics and the behavioral profile, and wherein implementing a verification procedure for the user to continue the current session includes, defining a verification procedure based on the calculated measure of distance which includes a verification challenge to the user, the verification challenge being based on the identified variations between the observed behavioral characteristics and the behavior profile.

12. The system of claim 11, further comprising:
a profiling component configured to develop the behavioral profile by identifying typical command invocation behavioral characteristics of the user from historical computer system usage data.

13. The system of claim 11, wherein verification component is configured to implement the verification procedure further based on a risk level of the current session.

14. The system of claim 11, wherein command invocation behavioral characteristics are selected from a group consisting of:
an order of command invocations;
a set of selected command options;
an order of entered command options;
a grammatical structure of a command invocation;
a set of words selected for a command invocation;
a order of words of a command invocation;
use of a shortcut for a command invocation;
a chosen method for a command invocation; and
a user input device used for command invocation.

15. The system of claim 11, wherein the profiling component is further configured to modify the behavioral profile based on the observed behavioral characteristics of the user's interactions with the computer system during the current session of computer system usage.

16. The system of claim 11, wherein the verification component is further configured to determine if the user is verified based on completion of the verification procedure by the user,
and further comprising a behavioral profile adaptation component configured to modify the behavioral profile based on the identified variations between the observed behavioral characteristics and the behavioral profile, if it is determined the user is verified.

17. The system of claim 11, wherein the verification component is configured to provide the verification challenge to the user, the verification challenge being based on the identified variations between the observed behavioral characteristics and the behavioral profile, and to permit the user to continue the current session based on the user's response to the verification challenge.

* * * * *